United States Patent [19]

Brachlianoff

[11] 3,974,577
[45] Aug. 17, 1976

[54] METHOD AND APPARATUS FOR THE ROTATION OF A SPHERICAL OBJECT AROUND A VIRTUAL AXIS PASSING THROUGH ITS CENTER

[76] Inventor: Arcady Brachlianoff, 12, rue de Gentilly, 92120 Montrouge, France

[22] Filed: July 28, 1975

[21] Appl. No.: 599,483

Related U.S. Application Data

[63] Continuation of Ser. No. 426,067, Dec. 19, 1973, abandoned.

[52] U.S. Cl. ................................. 35/46 R; 40/33; 74/210; 74/206; 74/198
[51] Int. Cl.² ................. G09B 27/00; G09F 11/10; F16H 13/12
[58] Field of Search .......... 35/46 R, 46 A, 47, 12 R, 35/12 L, 12 N; 40/30, 33; 33/15 A; 74/198, 210, 206, 190.5

[56] References Cited
UNITED STATES PATENTS

| | | |
|---|---|---|
| 2,586,421 | 2/1952 | Evers .................................... 74/198 |
| 2,727,396 | 12/1955 | Haugwitz .......................... 74/190.5 |
| 2,792,502 | 5/1957 | O'Connor ............................. 74/198 |
| 3,267,755 | 8/1966 | Iseley .................................... 74/198 |
| 3,269,190 | 8/1966 | Laman ................................... 74/198 |
| 3,377,719 | 4/1968 | Kroitor ............................... 35/46 R |
| 3,405,462 | 10/1968 | Belva et al. ........................ 35/46 R |
| 3,531,876 | 10/1970 | Phillips ............................... 35/46 R |

*Primary Examiner*—Samuel Scott
*Assistant Examiner*—Allan R. Burke
*Attorney, Agent, or Firm*—Edwin E. Greigg

[57] ABSTRACT

A method and apparatus for assuring the rotation of a spherical object around a virtual axis orientable at will. The object which is to be turned rests on at least three elements for suspension and rotation, whose relative orientation determines that of the virtual axis of rotation of the spherical object.

9 Claims, 9 Drawing Figures

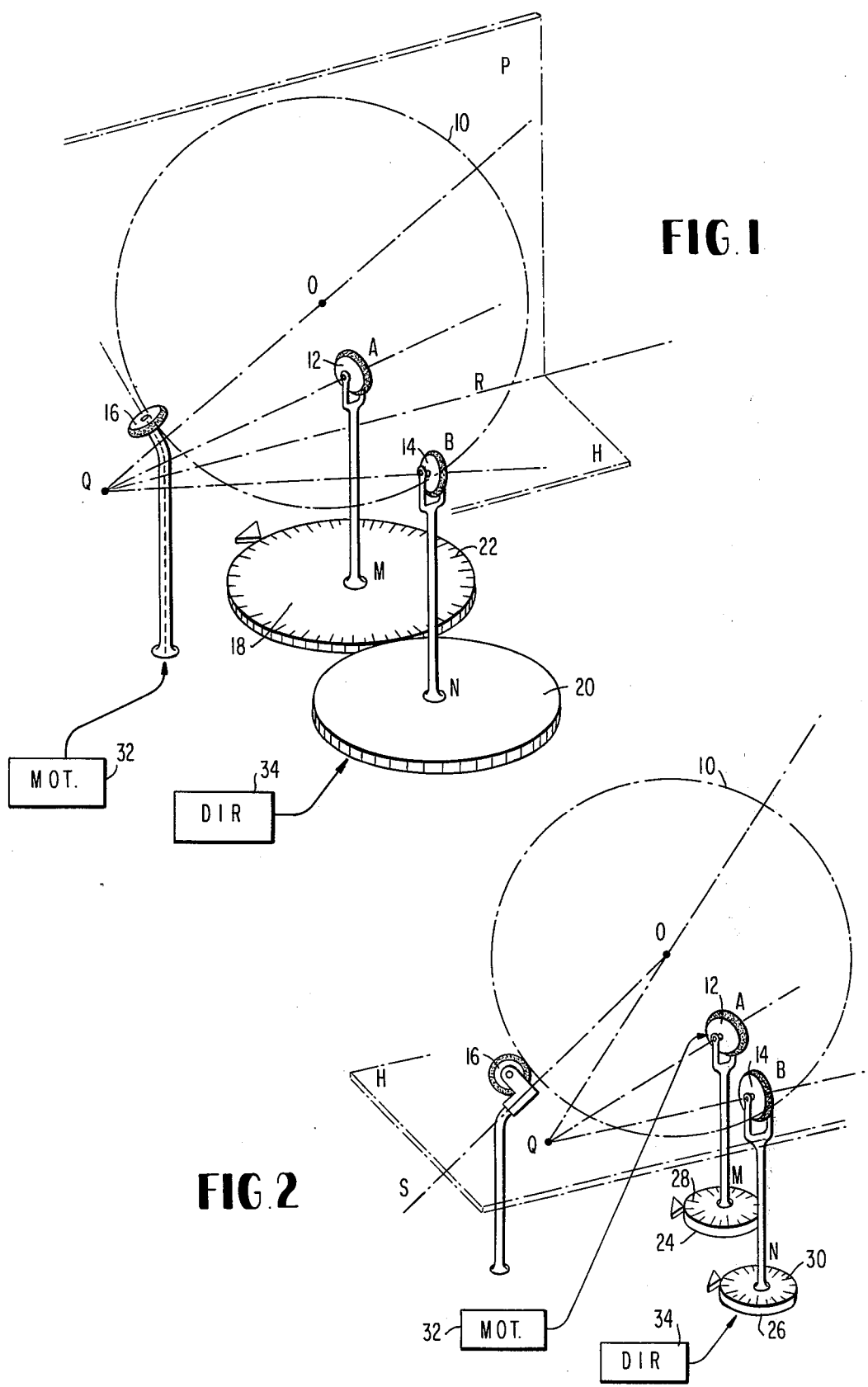

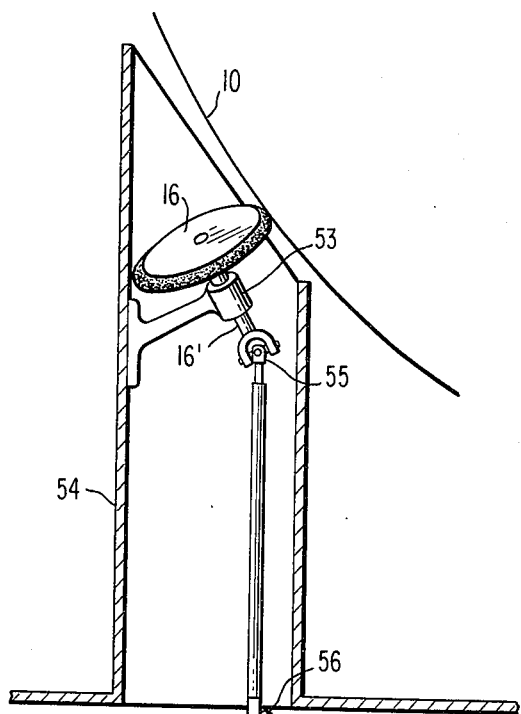
FIG.8
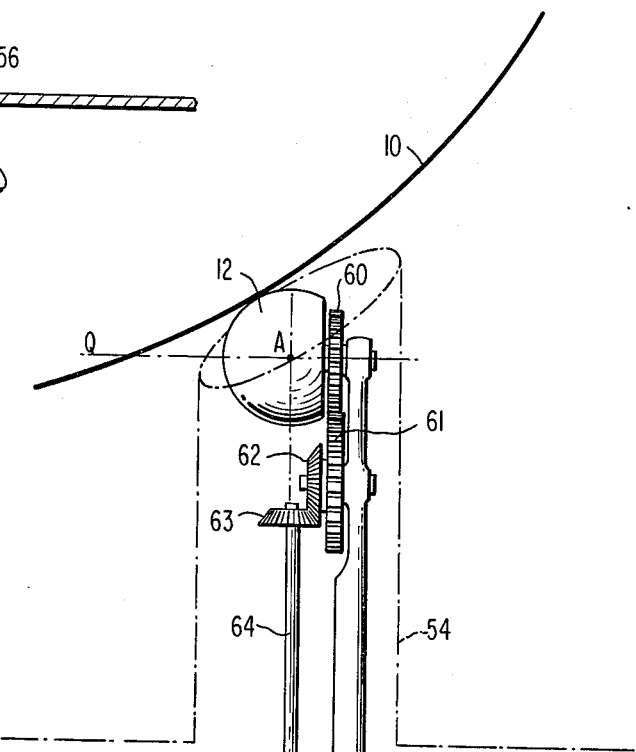
FIG.9
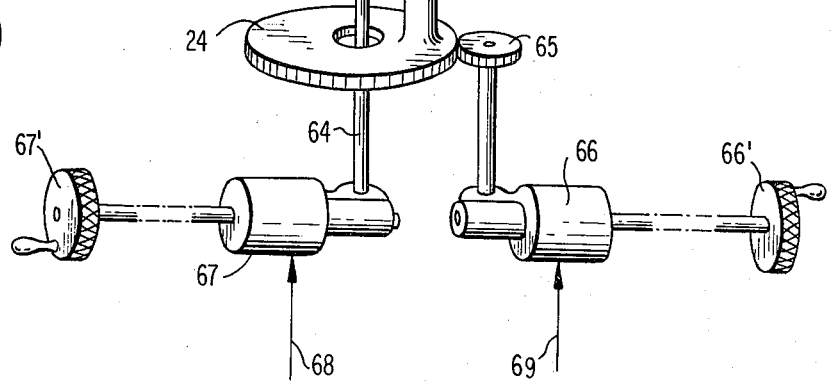

3,974,577

METHOD AND APPARATUS FOR THE ROTATION OF A SPHERICAL OBJECT AROUND A VIRTUAL AXIS PASSING THROUGH ITS CENTER

This is a continuation of application Ser. No. 426,067 filed Dec. 19, 1973 now abandoned.

BACKGROUND OF THE INVENTION

The present invention relates to a method which permits the turning of a spherical object around a virtual axis passing through its center with the orientation of the virtual axis being variable either while at rest or during rotation; and to an apparatus for the application of the process.

In order to rotate a spherical object, a world globe, for example, one generally employs an axis traversing the sphere, or a pivot, fixed at one point, at the pole of the globe, for example, or a suspension with a socalled cardan joint or universal joint.

Even though the known methods are perfectly satisfactory insofar as rotation itself is concerned and insofar as the orientation of the axis of rotation is concerned, however, for certain uses, they possess an inconvenience in the form of the material presence of a mechanical axis.

OBJECTS AND SUMMARY OF THE INVENTION

It is, therefore, an object of the present invention to provide the present state of the art with both a unique method and apparatus which does not possess the inconvenience of the prior art.

It is another object of the present invention to provide a unique method and apparatus according to which an object is rotated about a virtual axis which itself passes through the center of the object and which can be oriented at will.

It is another and more specific object of the present invention to provide an apparatus including at least three elements utilized in suspending the object and causing rotation thereof about a freely oriented axis.

These and other objects are accomplished according to the present invention by the provision of at least three roller elements which form a part of a suspension system for an object to be rotated, with the roller elements engaging the object, and being rotated against the object without slippage so that the object will, as a result, be rotated about an axis which passes through the center of the object, and with the orientation of the axis of rotation being changeable at will by changing the orientation of the roller elements.

BRIEF DESCRIPTION OF THE DRAWING

FIG. 1 is a perspective view illustrating a particular embodiment according to the present invention which shall, for reasons which will be explained below, be referred to as "apparatus with one parameter".

FIG. 2 is a perspective view illustrating a particular embodiment according to the present invention which shall be referred to as "apparatus with two parameters".

FIG. 8 is a perspective view illustrating in greater detail the driving mechanism for one of the rollers according to the present invention.

FIG. 9 is a perspective view illustrating in greater detail the driving mechanism for another of the rollers and one of the discs according to the present invention.

DESCRIPTION OF THE PREFERRED EMBODIMENTS

Figure 3:
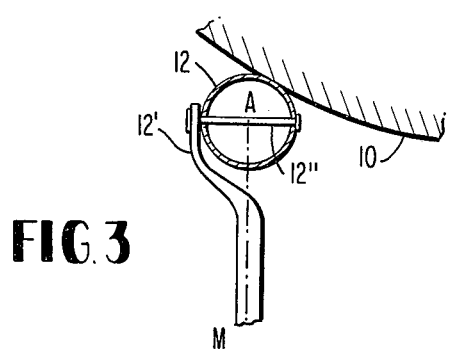
FIG. 3 is a more detailed view illustrating a roller according to the present invention.

Turning now more specifically to FIG. 1, a spherical object 10 rests by its own weight on three small wheels or rollers 12, 14 and 16, which form a triangle large enough to assure the support of the sphere 10. The spherical object 10 has a fixed axis situated in a plane P passing through the center O of the spherical object 10. The rollers 12 and 14 have their axes AQ and BQ symmetrical with respect to the plane P, and therefore intersect at a point Q of the plane P. Furthermore, the axes AQ and BQ can turn respectively around the two pivots AM and BN, which themselves are parallel to each other and perpendicular to the axes of the rollers. A fixture, for example, a set of coupled gears, 18 and 20, which respectively are fixedly attached along the axes AM and BN, assure that the axes AQ and BQ remain in symmetrical positions with respect to the plane P, while at the same time permitting that their orientation be changed at will.

The conditions described above permit the possibility of rolling the spherical object 10 on the three rollers 12, 14 and 16 without slipping.

In effect, the condition that a roller may roll without slipping on the sphere which is itself turning about an axis is that the axis of the roller intersects the axis of the sphere. This condition is effected by the three rollers 12, 14 and 16 if one takes the straight line OQ to be the axis of rotation of the sphere 10. This axis intersects the axes AQ and BQ of the two rollers 12 and 14 at the point Q; it also intersects the axis of the roller 16 since it is located in the plane P. Therefore, the straight line OQ is a possible axis, and the only possible axis of rotation of the sphere 10, permitting it to roll without slipping on the three rollers. It is sufficient that one of the rollers, for example, 16, be driven in order to achieve this rotation about the axis OQ.

If one changes the rotation of the rollers 12 and 14 by turning them symmetrically as described above, around their respective axes AM and BN, then the point Q describes the fixed straight line QR, which bisects the angle AQB, lying in the plane H, formed by the two axes AQ and BQ. The axis of rotation OQ of the spherical object 10 can therefore assume any possible orientation while remaining in the plane P. Accordingly, the apparatus shown is an apparatus with one parameter, and this parameter can be marked on the graduation 22.

FIG. 2 illustrates an alternate apparatus, according to the present invention, which permits varying the axis of rotation of the sphere 10 not only in one plane, but in all the spatial directions. Accordingly, the apparatus shown in FIG. 2 is an apparatus with two parameters.

As before, the sphere 10 is supposed to rest by its own weight on three rollers 12, 14 and 16. The rotational axes of 12 and 14, which lie in the same plane H, may turn about their axes AM and BN, which are parallel to each other and respectively perpendicular to the axes of the rollers, just as before. But here, there is no fixture connecting the two axes AQ and BQ, such as a set of coupled gears. According to this embodiment, the discs 24 and 26 are not coupled so that the rollers 12 and 14 may take independent directions with respect to one another. These independent orientations can be referenced by the graduations 28 and 30. The point of intersection of the two axes AQ and BQ can therefore lie anywhere in the plane H.

The third roller 16 is of the self-orienting type, normally called a "caster". Its pivotal axis OS is directed toward the center of the sphere 10 and during rotation of the sphere 10, the roller 16 orients itself in such a manner as to permit rolling without slipping, whatever may be the sense of that rotation, or the orientation of its axis. The sphere is thus supported by the three rollers 12, 14 and 16, one of them, 12 or 14, is made a driven roller and imparts to the sphere a rotation around the axis OQ.

The variations of the two discs 24 and 26, referenced by the graduations 28 and 30, permit the axis OQ to take all the possible directions around the point O. Therefore, this is an apparatus with two parameters.

For reasons of clarity, the rollers 12 and 14 have been represented in the figures by simple wheels including a rubber or plastic tire in order to assure adherence with the sphere 10. FIG. 3 illustrates one preferred configuration of these rollers. The roller 12, according to this configuration, has a spherical shape mounted to a specially configured shaft 12' by a pin 12'' so that the center of the spherical roller is located on the pivot axis AM. Thus, the change of orientation of the axis of the spherical roller 12 about the pivot axis AM does not move the sphere 10. The roller 14 is similarly configured and mounted.

This invention finds application, for example, as an apparatus intended for advertising, publicity, or for the construction of luxury or utility buildings. One can also make decorative objects or toys. In all cases, an apparatus motor 32 acts on the driven wheel (for example, 16 in FIG. 1); and a director device 34 acts on the gears 18, 20 and discs 24 and 26 to control rotation about the axes AM and BN, in order to change the axis of rotation of the sphere 10 as explained above.

Figure 4:
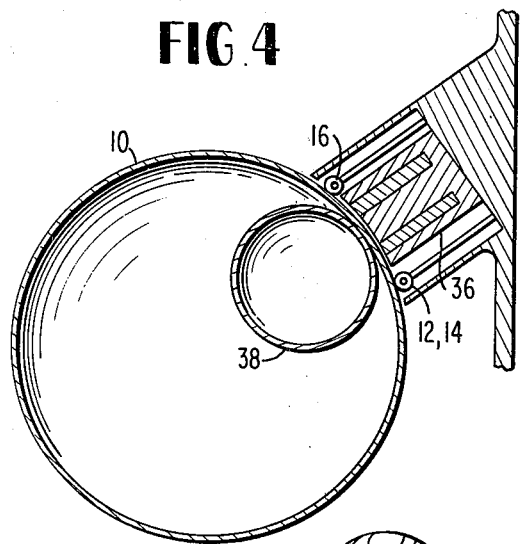
FIGS. 4 and 5 illustrate an apparatus according to the present invention wherein the sphere is maintained against the rollers by an electromagnet.
Figure 5:
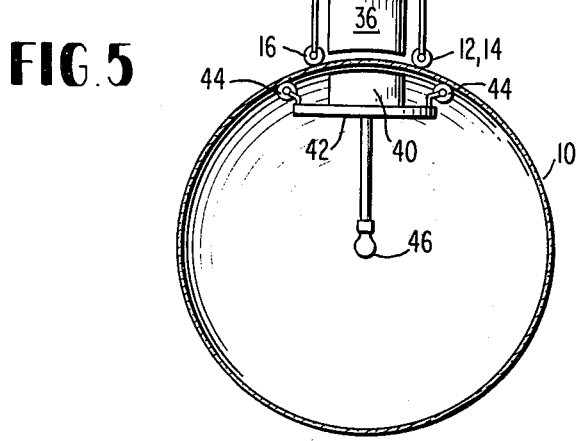

FIGS. 4 and 5 show, by way of example, a similar apparatus in which the sphere 10 to be rotated, instead of resting by its own weight on rollers or wheels, is held in a direction against these rollers by the attractive force of an electromagnet 36 which acts on a small sphere 38 of ferrous matter (FIG. 4) or on a piece of iron 40 (FIG. 5), both of which roll within the inside of the sphere 10. The piece of iron 40 is attached to a bracket 42 which in turn rolls within the sphere 10 with the aid of three self-orienting rollers 44 (casters). This permits suspending the sphere 10 on a wall, on a ceiling, to a sort of reflector or a bracket or the like. For example, the sphere 10 can carry commercial or amusing messages. In FIG. 5, the sphere 10 is translucent and equipped with a lamp 46 at its center.

The motor is located within the base of the apparatus (not shown) and turns the sphere 10 through the intermediate action of the rollers, as described above; while the director varies the orientation of the rotation of the sphere 10.

Figure 6:
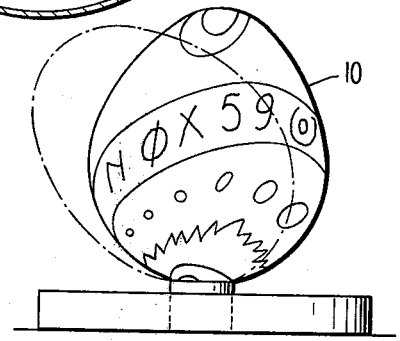
FIG. 6 illustrates an exemplary alternate form of the object according to the present invention.

FIG. 6 illustrates an extension of the present invention. According to this embodiment, the object 10 is not spherical, but does have curved surfaces so that it can be rotated. It exhibits unpredictable movements around an invisible axis that is constantly changing, producing thereby a very startling effect. Such an object can be quite effective from a publicity standpoint.

Figure 7:
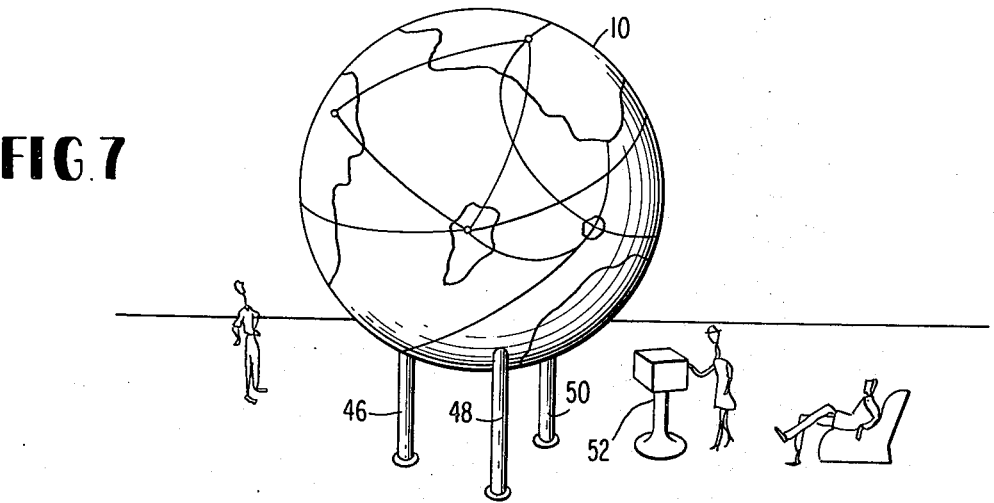
FIG. 7 illustrates a globe which is supported and rotated utilizing the method and apparatus according to the present invention.

In FIG. 7, a large sphere 10, for example, a globe, having the imprint of the network served by an Airline or having some other graphical inscription, rests on three small columns 46, 48, 50, which house the rollers 12, 14 and 16. A remote control device 52 permits orienting the sphere 10 at will as explained previously or to impart to it a surprising or alluring rotation.

One can also employ the method according to the present invention to the manufacture of games of skill or competition, in which two or more players acting at the same time, or in turn, on the command parameters of the rotation of the sphere, attempt to impart to it the movements which may be determined by the rules of the game, for example: to make the sphere execute a certain maneuver in a minimum amount of time, or again, to act on one of the parameters, in contradiction to the efforts of one's partner who acts on the other parameter. The surface of the sphere can be partitioned into zones having more or less complicated contours, and then it would be the problem for each player to bring one of the zones directly opposite a particular point, or electrical contact which would count up the points, etc.

In the area of cinematography, especially in animated movies, if it were necessary to film a rotating sphere, a globe, or a model of a planet, for example, it is often troublesome that one sees the axis or the support thereof. The method, according to the present invention, makes it possible to turn such an object, which appears to have complete spatial freedom.

The control of such apparatus comprises:
1. the control for the rotation of the sphere;
2. the control for the orientation of the axis.

These two controls can be effected manually, with transmissions of mechanical, electrical, electronic, pneumatic or hydraulic nature. They can also be ensured by programmed or non-programmed mechanisms that are a part of the apparatus itself.

FIGS. 8 and 9 each illustrates one exemplary disposition of the rollers 16 and 12, respectively, and the method for controlling, by means of these rollers, both the rotation of the sphere 10 and the change in orientation of the axis of that rotation.

In FIG. 8, the driven roller 16 of the embodiment of FIG. 1 is shown to have a fixed axis of rotation defined by a shaft 16' which is secured by a holding bracket 53 integral with a housing 54. A double drive-shaft transmission 55–56 connects the shaft 16' of the rollers 16 to the motor element which may be an electric motor 32' controlled by a channel 57 or a hand operated thumbwheel or crank 58, or even both elements 57 and 58 together.

In FIG. 9, the roller 12 of the embodiment of FIG. 2 is shown. This roller is both the driving roller (it is the one which, by contact, communicates movement to the sphere 10 as explained above) and also the orienting roller, i.e. by a change of orientation of its axis AQ, it produces a change of orientation of the axis OQ (FIG. 2) of the sphere 10. This double function is assured in the following way: Roller 12 has the form of a truncated sphere, as already shown in FIG. 3. Its axis AQ turns in a bracket 59 carried by the gear disc 24. The rotation of the roller 12 about its axis AQ is assured by a motor 67 (in the case of an electric control) or a crank 67' (in the case of a manual control) over the gears 60, 61, 62, 63 and the shaft 64. The change of orientation of the axis AQ is effected by the rotation of the gear disc 24, controlled, over other gears such as 65, by a motor 66 (electric control), or a crank 66' (manual control). The electric control channels such as 57 (FIG. 8) and 68, 69 (FIG. 9) terminate either in a control console such as 52 in FIG. 7 or in a classical electro-mechanical or electronic programming apparatus which can vary in an infinite number without departing from the scope of the present invention.

What is claimed is:

1. A method for rotating a generally spherical object about a virtual axis, orientable at will, passing through its center, comprising the steps of:
   a. mounting the object to a structure including three roller elements which press against the object and whose axes of rotation intersect said virtual axis;
   b. driving one of the roller elements about its axis of rotation, thereby causing rolling action without slipping between the object and all three roller elements, which, in turn, causes rotation of the object about its virtual axis; and
   c. changing the orientation of said virtual axis whether the object is at rest or in motion by changing the orientation of the axis of rotation of at least one of the other two roller elements in such a way that whichever is changed, at any moment each of the axes of these elements intersects said virtual axis.

2. The method as defined in claim 1, wherein the axis of rotation of the driven element is a fixed axis, the method further comprising the steps of:
   d. coupling the motion of the other two roller elements so that the axes of rotation of both other roller elements are symmetrical to and always intersect along a line lying in a plane containing the virtual axis of the object in all of its orientations; and
   e. arranging the fixed axis of the driven roller element so that it lies in the plane containing the virtual axis of the object and the intersection of the axes of rotation of the other two roller elements.

3. The method as defined in claim 1, further comprising the steps of:
   f. controlling the motion of the driven roller element and one of the other two roller elements so that the orientation of their axes of rotation can be effected independently of each other but such that the intersection of the axes of rotation of these roller elements always lies in the same plane for all orientations of the virtual axis of the object; and
   g. providing a self-orienting caster type for the third roller element.

4. The method as defined in claim 1, wherein the orientation of the virtual axis is manually controlled utilizing a mechanical transmission.

5. The method as defined in claim 1, wherein the orientation of the virtual axis is manually controlled utilizing an electrical transmission.

6. An apparatus for rotating a generally spherical object about a virtual axis, orientable at will, passing through its center, comprising:
   a. a mounting structure including three roller elements which press against the object and whose axes of rotation intersect said virtual axis;
   b. drive means connected to one of said roller elements for driving said element about its axis of rotation, thereby causing rolling action without slipping between the object and all three roller elements, which, in turn, causes rotation of the object about its virtual axis; and
   c. means connected to at least one of the other two roller elements for changing the orientation of the axis of rotation thereof and consequently the orientation of the virtual axis, in such a way that whichever is changed, at all times each of the axes of these roller elements intersects said virtual axis.

7. The apparatus as defined in claim 6, further comprising
   d. means coupling said other two roller elements so that the motion of each is coordinated such that the axis of rotation of each of these other two roller elements is symmetrical and always intersects along a line lying in a plane containing the virtual axis of the object in all of its orientations; and wherein
   e. said driven roller element has a fixed axis of rotation, with the fixed axis lying in the plane containing the virtual axis of the object and the intersection of the axes of rotation of the other two roller elements.

8. The apparatus as defined in claim 6, wherein said orientation changing means is connected to said driven roller element and to one of the other two roller elements so that the orientation of each can be effected independently of one another by such that the intersection of the axes of rotation of both roller elements always lie in the same plane for all orientations of the virtual axis of the object; and wherein the third one of said roller elements is of the self-orienting caster type.

9. The apparatus as defined in claim 6, wherein said mounting structure includes magnetic means for causing the object to bear against said elements.

* * * * *